US010230860B2

(12) United States Patent
Yamaki

(10) Patent No.: US 10,230,860 B2
(45) Date of Patent: Mar. 12, 2019

(54) AUTHENTICATION APPARATUS FOR CARRYING OUT AUTHENTICATION BASED ON CAPTURED IMAGE, AUTHENTICATION METHOD AND SERVER

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Kouji Yamaki, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/230,650

(22) Filed: Aug. 8, 2016

(65) Prior Publication Data

US 2018/0041654 A1    Feb. 8, 2018

(51) Int. Cl.
*H04N 1/04* (2006.01)
*H04N 1/00* (2006.01)
*G06K 9/00* (2006.01)

(52) U.S. Cl.
CPC ..... *H04N 1/00854* (2013.01); *G06K 9/00288* (2013.01); *H04N 1/00244* (2013.01); *H04N 1/00251* (2013.01); *H04N 1/00347* (2013.01); *H04N 1/00875* (2013.01)

(58) Field of Classification Search
CPC ........... H04N 1/00251; H04N 1/00244; H04N 1/00347; H04N 1/00875

USPC ..................................... 358/1.14, 1.15, 1.13
See application file for complete search history.

(56) References Cited

U.S. PATENT DOCUMENTS

| 7,460,692 | B2* | 12/2008 | Mizutani | G06K 9/00255 |
| | | | | 358/1.14 |
| 7,925,060 | B2* | 4/2011 | Norita | G06K 9/00214 |
| | | | | 382/115 |
| 2004/0136574 | A1* | 7/2004 | Kozakaya | G06K 9/00228 |
| | | | | 382/118 |
| 2013/0314208 | A1* | 11/2013 | Risheq | G07C 9/00158 |
| | | | | 340/5.53 |
| 2014/0341427 | A1 | 11/2014 | Kawano | |
| 2015/0036180 | A1* | 2/2015 | Naruse | G06K 15/005 |
| | | | | 358/1.15 |
| 2016/0070956 | A1* | 3/2016 | Lu | G06K 9/00268 |
| | | | | 382/118 |
| 2017/0289596 | A1* | 10/2017 | Krasadakis | H04N 21/25883 |

OTHER PUBLICATIONS

Niiinuma, et al. "Continous User Authentication Using Temporal Information".

(Continued)

*Primary Examiner* — Houshang Safaipour
(74) *Attorney, Agent, or Firm* — Amin, Turocy & Watson LLP

(57) ABSTRACT

In accordance with an embodiment, an authentication apparatus comprises an image capturing device, a memory and a controller. The image capturing device photographs a person to acquire a captured image. The memory stores the captured image. The controller generates a determination reference of authentication on the basis of a plurality of the captured images and carries out the authentication of the person in the captured image on the basis of the determination reference.

14 Claims, 7 Drawing Sheets

(56) References Cited

OTHER PUBLICATIONS

Khan, et al. "Biometric Driven Initiative System for Passive Continuous Authentication" 2011 IEEE, pp. 139-144.
Dantcheva, et al. "Bag of soft biometrics for person identification", Multimed Tools Appl, 2011, 51, pp. 739-777.
Kim, et al. "A Survey and Proposed Framework on the Soft Biometrics Technique for Human Identification in Intelligent Video Surveillance System", Journal of Biomedicine and Biotechnology, vol. 2012.

* cited by examiner

AUTHENTICATION APPARATUS FOR CARRYING OUT AUTHENTICATION BASED ON CAPTURED IMAGE, AUTHENTICATION METHOD AND SERVER

FIELD

Embodiments described herein relate generally to an authentication technology based on a captured image.

BACKGROUND

Conventionally, there is an authentication method of a user by an image forming apparatus that uses a password or an IC card. There is also an authentication method that uses the face of a user photographed by a camera for authentication.

In the password authentication method, it is necessary to register the password in advance and regularly update the password. Further, in the password authentication method, it is necessary for the user to input the password. In the authentication method using the IC card, it is necessary for the user to hold the IC card over a reading device. In the authentication method using the face of the user photographed by the camera, it is necessary for a manager to previously register the face of the user determined for matching.

These conventional authentication methods each have a problem that it takes time and labor by the manager or user.

DETAILED DESCRIPTION

In accordance with an embodiment, an authentication apparatus comprises an image capturing device, a memory and a controller. The image capturing device photographs a person to acquire a captured image. The memory stores the captured image. The controller generates a determination reference of authentication on the basis of a plurality of the captured images and carries out the authentication of the person in the captured image on the basis of the determination reference.

An authentication method according to the present embodiment includes generation of determination reference of authentication on the basis of a plurality of captured images and execution of the authentication of a person in the captured image on the basis of the determination reference.

A server according to the present embodiment receives a plurality of captured images from an external terminal, generates determination reference of authentication on the basis of a plurality of the captured images and carries out the authentication of a person in the captured image acquired from the external terminal on the basis of the determination reference.

Hereinafter, each embodiment is described with reference to the accompanying drawings.

First Embodiment

Figure 1:
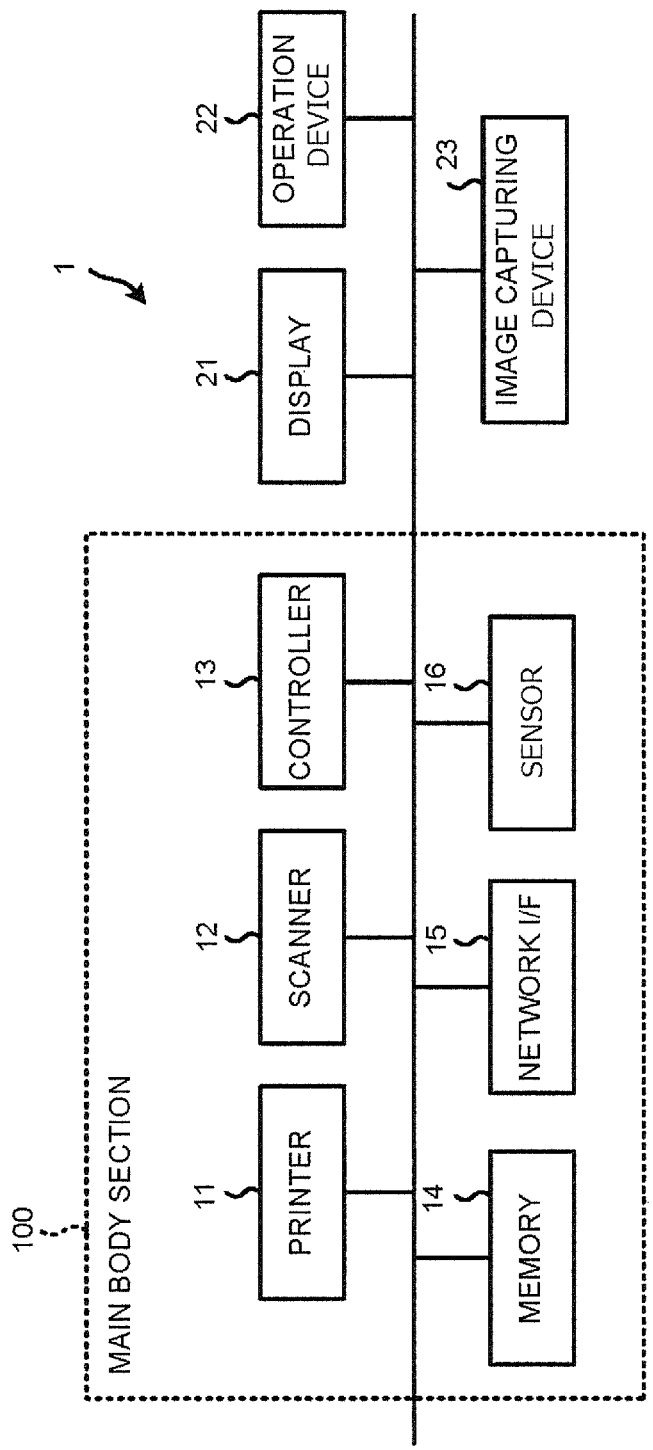
FIG. 1 is a block diagram illustrating the configuration of an image forming apparatus.

FIG. 1 is a block diagram illustrating the configuration of an image forming apparatus 1.

The image forming apparatus 1 (authentication apparatus) is a MFP (Multi-Function Peripheral) having a plurality of functions such as printing, scanning and the like. The image forming apparatus 1 is equipped with a printer 11, a scanner 12, a controller 13, a memory 14, a network interface 15, a sensor 16, a display 21, an operation device 22 and an image capturing device 23.

The printer 11 forms an image on a sheet with toner or ink. The scanner 12 reads the image on the sheet placed on a document table. The controller 13 serving as a CPU (Central Processing Unit) or a processor reads programs in the memory 14 to carry out various processing. The controller 13 controls the whole of the image forming apparatus 1. The network interface 15 is used at the time the controller 13 communicates with an external terminal in a wired or wireless manner. The sensor 16 detects that there is a person around or in the vicinity of the image forming apparatus 1 through change of the amount of received light of infra-red rays. The elements 11-16 constitute a main body section 100.

Figure 2:
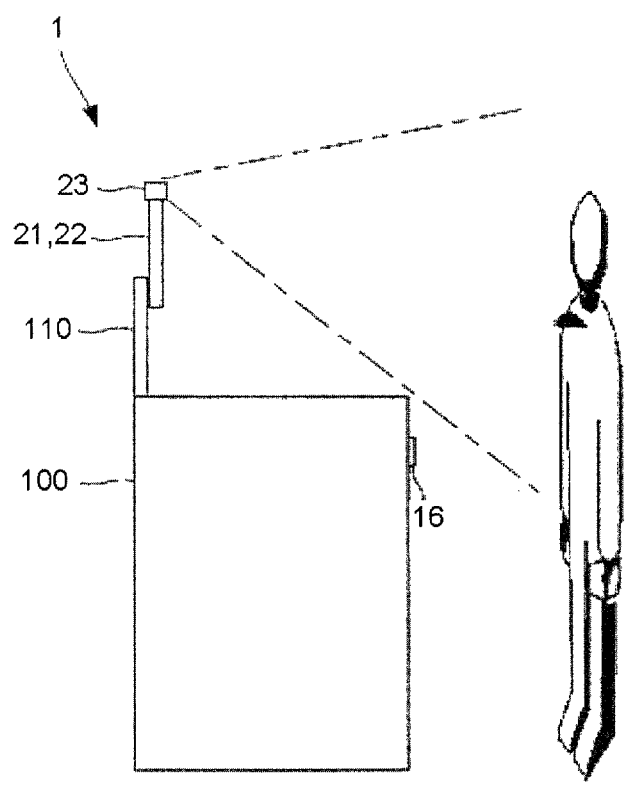
FIG. 2 is a side view of the image forming apparatus.

FIG. 2 is a side view of the image forming apparatus 1.

A support member 110 is arranged on the main body section 100. The support member 110 extends upwards from the main body section 100 to support the display 21 and the operation device 22. The display 21 and the operation device 22 are integrated into, for example, a control panel. The display 21 displays setting information and an operation status of the image forming apparatus 1, log information and a notification to a user. The operation device (input device) 22, equipped with keys or buttons, receives input by the user. The operation device 22 may be a touch panel and may also function as a display. The display 21 supports the image capturing device 23. The support member 110 may support the image capturing device 23.

The image capturing device 23 is a camera. If the sensor 16 detects a person, the image capturing device 23 photographs the person to acquire a captured image. When an average adult user stands in front of the image forming apparatus 1, a position of the image capturing device 23 is a position at which chest to head of the user can be photographed and a direction thereof is a direction in which the chest to the head can be photographed. The image capturing device 23 photographs the person within any range at any angle. The image capturing device 23 may capture not only a still image and may also capture a moving image.

Figure 3:
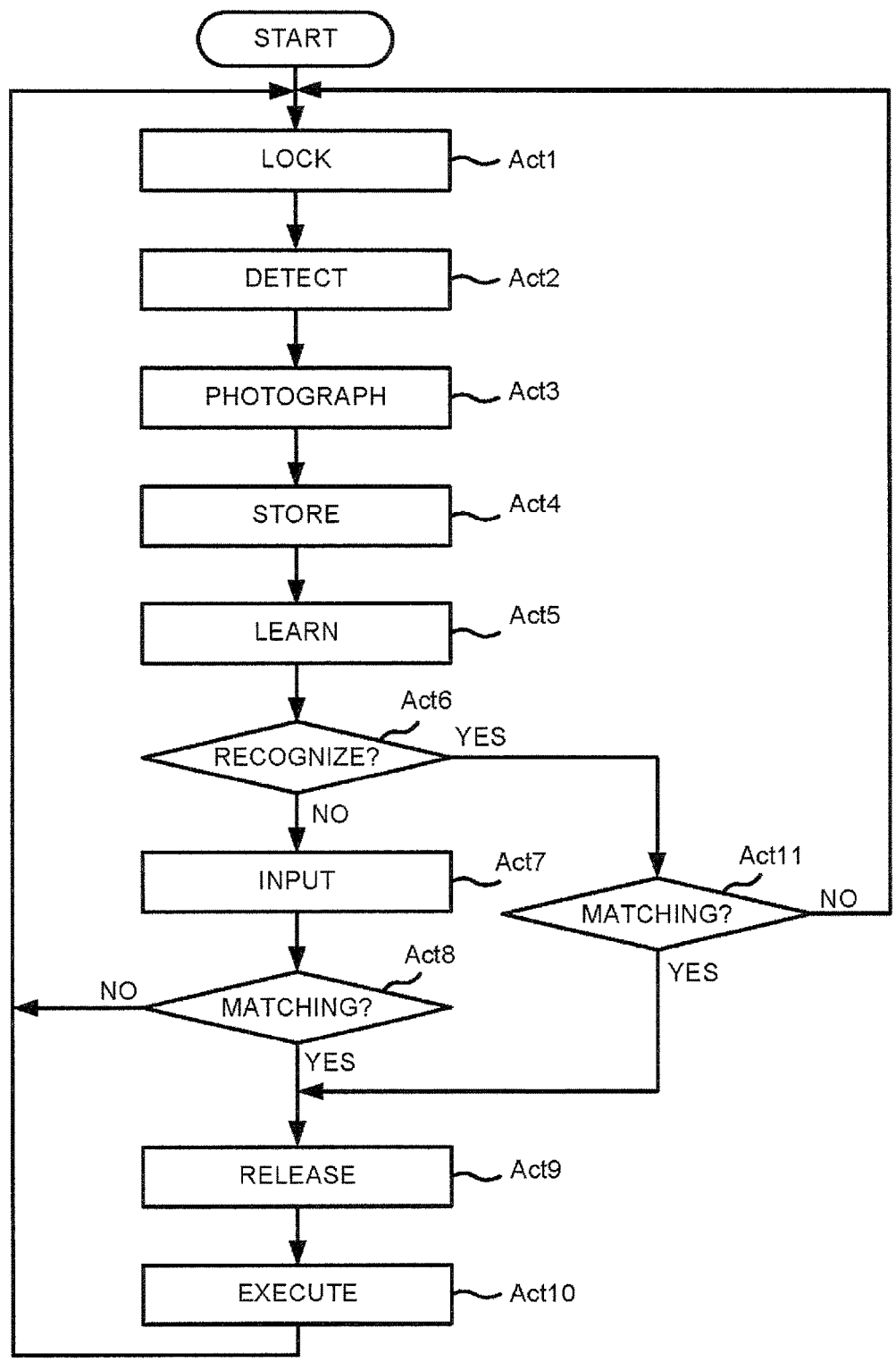
FIG. 3 is a flowchart illustrating the flow of an authentication processing by a controller.

The flow of an authentication processing by the controller 13 is described with reference to FIG. 3.

The controller 13 causes the image forming apparatus 1 to enter into a locking state at the same time of activation after power source of the image forming apparatus 1 is turned on (Act 1). In the locking state, the controller 13 restricts input received by the operation device 22 and input of an execution instruction of a job such as printing or scanning. In the present embodiment, the controller 13 carries out initial authentication through a login name and a password until common characteristics of the appearance of the user are recognized on the basis of the captured image. In other words, the controller 13 carries out initial authentication through a login name and a password until a determination reference of the authentication is generated on basis of a plurality of the captured images. The controller 13 displays an input screen of the login name and the password on the display 21. In a case of carrying out the initial authentication with an IC card, the controller 13 displays a message "Hold the IC card over a reading device" on the display 21. The controller 13 does not display a screen capable of inputting the execution instruction of the printing or scanning as long as the locking state is not released.

The user comes to the periphery of the image forming apparatus 1 to input the login name and the password at the time of using the image forming apparatus 1. The controller 13 detects that the user stands around the image forming apparatus 1 through the sensor 16 (Act 2).

The controller 13 initiates photographing the user to acquire the captured image through the image capturing device 23 (Act 3).

The controller 13 stores the captured image in the memory 14 (Act 4).

The processing in Act 5 and the processing in Act 6 are described later.

The controller 13 receives the input of the login name and the password through the operation device 22 (Act 7).

The controller 13 carries out the authentication through the login name and the password, and releases the locking state (Act 9) if it is determined that the user is matching (YES in Act 8).

The controller 13 displays the screen capable of inputting the execution instruction of the printing or scanning to execute the job such as the printing or scanning through the instruction of the user (Act 10).

The controller 13 causes the image forming apparatus 1 to enter into the locking state again with elapse of a certain time after the job is executed (Act 1), and executes the processing in Act 1 to Act 10. As the processing in Act 1 to Act 10 is repeated, various captured images of the user who uses the image forming apparatus 1 are accumulated.

The controller 13 learns the common characteristics of the appearance of the user photographed so far through a deep learning method each time the user is photographed (Act 5).

The controller 13 can recognize the common characteristics of the appearance of the user if a lot of the captured images of the user are accumulated. The controller 13 recognizes, for example, parts having a high matching rate with the appearance of the user in the captured image as the common characteristics of the appearance of the user. Thus, the controller 13 generates common characteristics of the appearance of the user in a plurality of the captured images as a determination reference of the authentication. The common characteristics of the appearance of the user may be clothes (for example, color and shape of the clothes), face (for example, color of eyes, gender and color of hair), and body type (for example, height and width of body). If the image forming apparatus 1 is placed in a company, the controller 13 recognizes, for example, the color and the shape of the uniform the users wear of the company as the common characteristics.

The controller 13 carries out the authentication through the login name and the password (Acts 7 and 8) before recognizing (generating) the common characteristics of the appearance of the user (NO in Act 6).

The controller 13 carries out the authentication of the user on the basis of the captured image of the user (Act 11) after recognizing (generating) the common characteristics of the appearance of the user (YES in Act 6).

In this way, the controller 13 generates common characteristics of the appearance of the user in a plurality of the captured images as a determination reference of the authentication to carry out the authentication of the user with the common characteristics, and stores them in the memory 14. At the time of carrying out the authentication of some user, the controller 13 firstly extracts characteristics of the appearance of the user corresponding to the common characteristics from the captured images of the user. Then, the controller 13 determines the user is matching if the matching rate between the extracted characteristics of the appearance of the user and the common characteristics of the appearance of the user reaches a reference.

For example, when the image forming apparatus 1 is placed in the company, a case is considered in which the controller 13 recognizes the color and the shape of the uniform of the company as the common characteristics of the appearance of the user. In this way, if a user stands in front of the image forming apparatus 1 which is in the locking state (Act 1), the image capturing device 23 photographs the user (Acts 2~4). The controller 13 deepens the learning on the basis of the captured image (Act 5, and YES in Act 6) and carries out the authentication of the user on the basis of the captured image of the user (Act 11). In a case in which the user wears the uniform of the company, the controller 13 determines that the user wears the uniform of the company to determine that the user is matching (YES in Act 11). Then, the controller 13 releases the locking state (Act 9). In a case in which the user as an outsider does not wear the uniform, the controller 13 determines that the user does not wear the uniform to determine that the user is not matching (NO in Act 11). Then, the controller 13 causes the image forming apparatus 1 into the locking state (Act 1).

Second Embodiment

Figure 4:
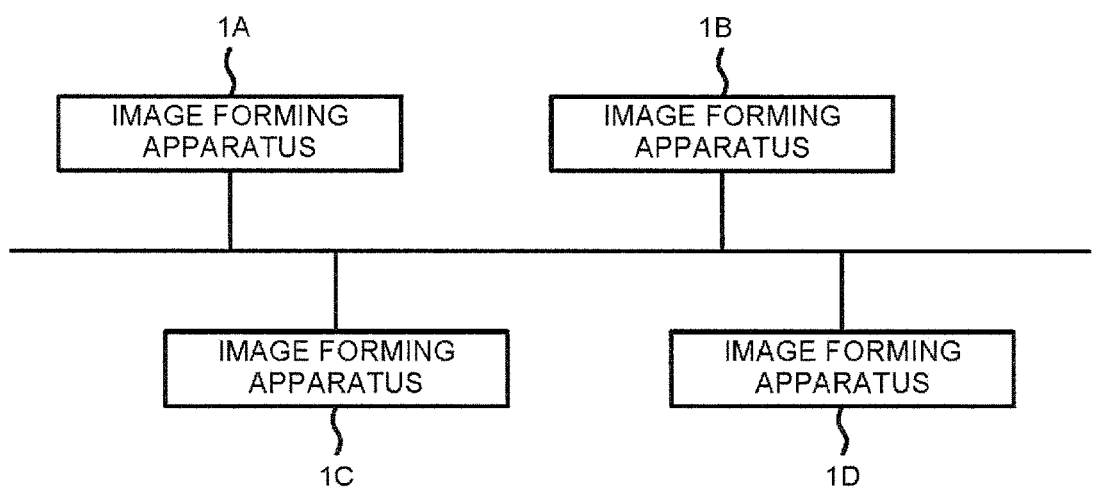
FIG. 4 is a diagram illustrating the configuration of a network of the image forming apparatus.
Figure 5:
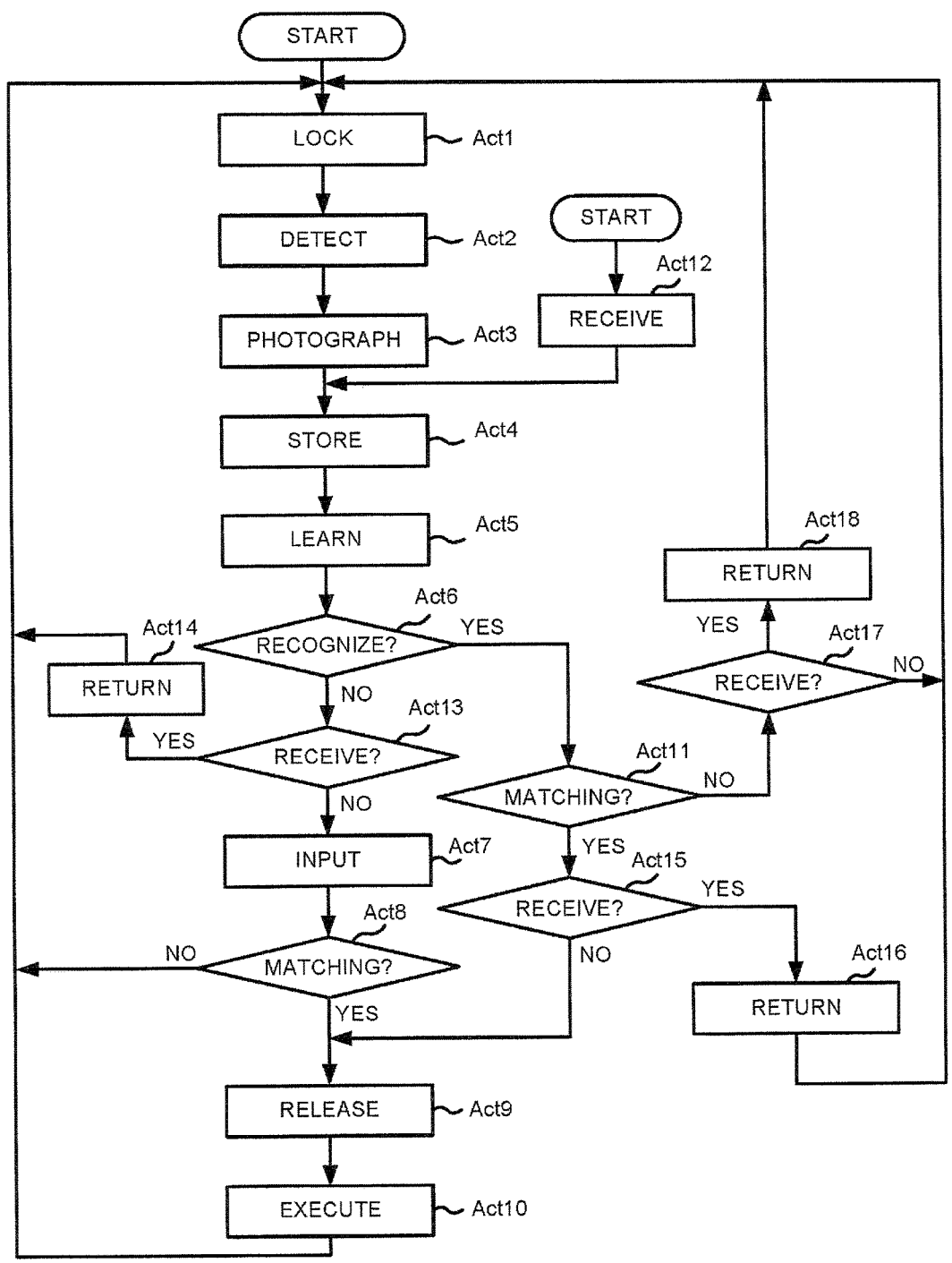
FIG. 5 is a flowchart illustrating an authentication processing by the image forming apparatus.

FIG. 4 is a diagram illustrating the configuration of a network of image forming apparatuses 1A~1D. FIG. 5 is a flowchart of an authentication processing by the image forming apparatus 1A.

For example, the image forming apparatuses 1A~1D are placed in the same company and connected with each other via the network. In the present system, the image forming apparatus 1A functions as a server for carrying out the authentication based on the captured image and the learning of the captured image. In the present system, the image forming apparatuses 1B~1D send the captured images to the image forming apparatus 1A (server) and function as external terminals receiving an authentication result from the image forming apparatus 1A.

The image forming apparatuses 1A~1D carry out the authentication through the login name and the password as initial setting thereof. The image forming apparatus 1A receives the captured images of the user from the image forming apparatuses 1B~1D (Act 12), and stores the received captured images in the memory 14 (Act 4). Further, the image forming apparatus 1A (the controller 13) photographs the user (Acts 1~3), and stores the image of the photographed user in the memory 14 (Act 4). The image forming apparatus 1A (the controller 13) learns the common characteristics of the appearance of the user of the image forming apparatus 1A~1D (Act 5).

The image forming apparatus 1A (the controller 13) determines that the image forming apparatus 1A (the controller 13) receives the captured images of the user from the image forming apparatuses 1B~1D (Act 13) before recognizing the common characteristics of the appearance of the user (NO in Act 6). If the image forming apparatus 1A (the controller 13) receives the captured images of the user from the image forming apparatuses 1B~1D (Act 13), the image forming apparatus 1A (the controller 13) returns a message indicating that the common characteristics of the appearance of the user are not recognized to the image forming apparatuses 1B~1D that send the captured images of the user (YES in Act 13, and Act 14). The image forming apparatuses 1B~1D receive the message to carry out the authentication through the login name and the password.

The image forming apparatus 1A (the controller 13) carries out the authentication of the user on the basis of the captured image of the user (Act 11) after recognizing the common characteristics of the appearance of the user (YES in Act 6). The image forming apparatus 1A (the controller 13) returns that the user is matching to the image forming apparatuses 1B~1D that send the captured images of the user (YES in Act 15, and Act 16) if it is determined that the user is matching (YES in Act 11). The image forming apparatus 1A (the controller 13) returns that the user is not matching to the image forming apparatuses 1B~1D that send the captured images of the user (YES in Act 17, and Act 18) if it is determined that the user is not matching (NO in Act 11).

The image forming apparatuses 1B~1D determine whether to release the locking state on the basis of the result of the authentication of the user that is received from the image forming apparatus 1A.

Third Embodiment

Figure 6:
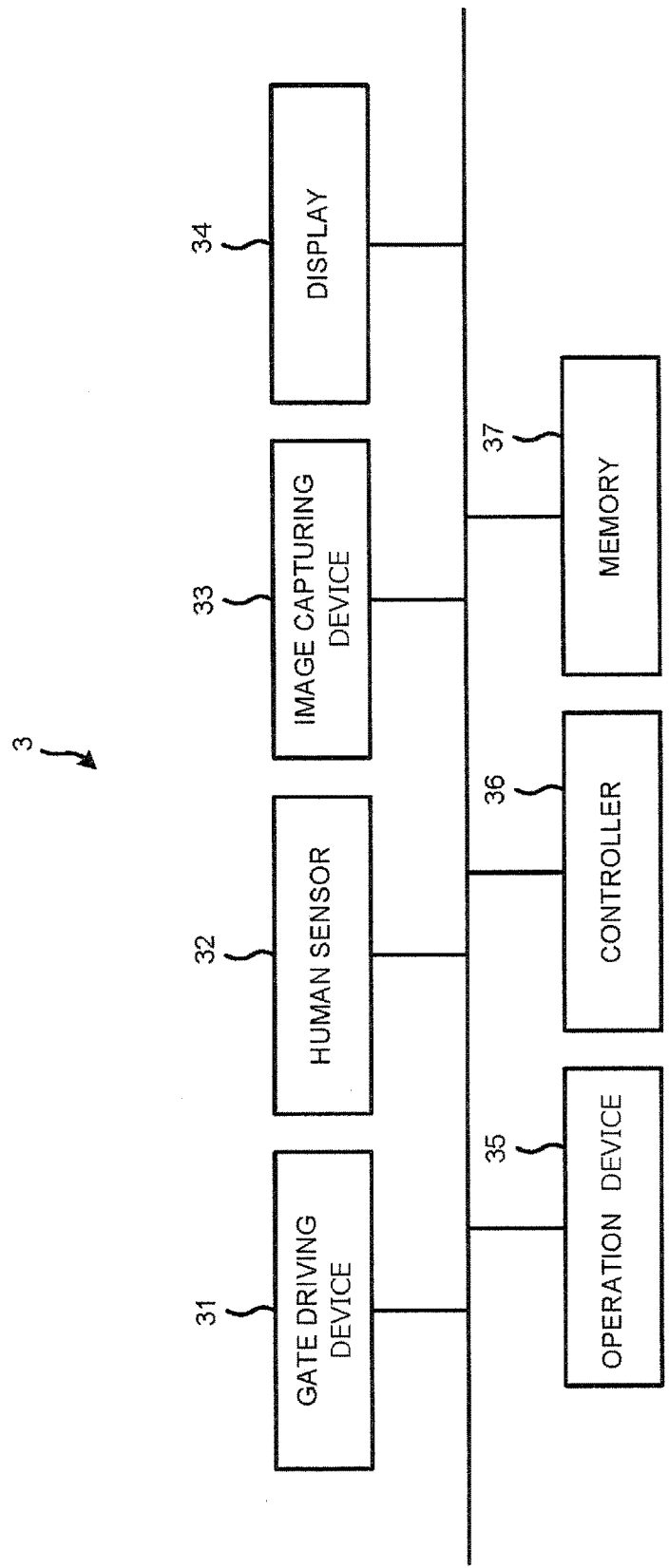
FIG. 6 is a block diagram illustrating the configuration of a gate system.

FIG. 6 is a block diagram illustrating the configuration of a gate system 3.

The gate system 3 (authentication apparatus) is applied to, for example, a gate of children's facilities.

The gate system 3 is equipped with a gate driving device 31, a sensor 32, an image capturing device 33, a display 34, an operation device 35, a controller 36 and a memory 37.

The gate driving device 31 opens or closes the gate of the children's facilities. The sensor 32 detects a user of the gate system 3 who stands around the gate. The image capturing device 33 photographs the user who stands around the gate. The image capturing device 33 is arranged at a position where the height of the user can be determined from a captured image and arranged in a direction in which the height of the user can be determined. The display 34 displays setting information and an operation status of the gate system 3, log information and a notification to the user. The operation device 35 receives input by the user. The controller 36 serving as a CPU reads programs in the memory 37 to carry out various processing. The controller 36 controls the whole of the gate system 3.

Figure 7:
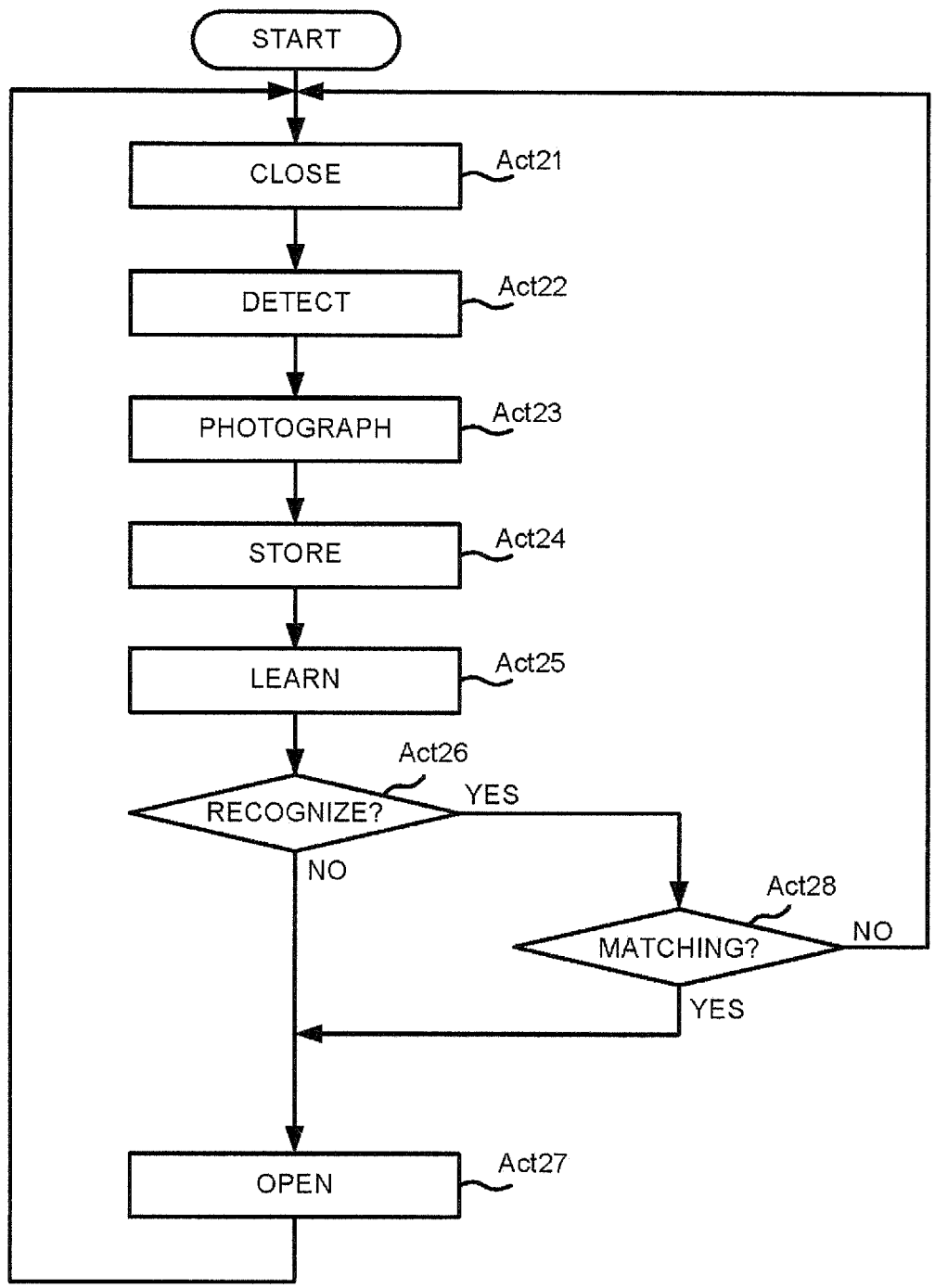
FIG. 7 is a flowchart illustrating the flow of an authentication processing by the controller.

Hereinafter, an authentication processing of the user by the controller 36 is described in brief with reference to FIG. 7.

The controller 36 closes the gate through the gate driving device 31 at the time the power source of the gate system 3 is turned on (Act 21). The controller 36 detects the user around the gate through the sensor 32 (Act 22), and photographs the user through the image capturing device 33 (Act 23). The controller 36 stores the captured image in the memory 37 (Act 24).

The controller 36 learns common characteristics of the appearance of the user on the basis of the captured image of the user (Act 25).

The controller 36 opens the gate through the gate driving device 31 (Act 27) if the common characteristics of the appearance of the user are not yet recognized (NO in Act 26).

The controller 36 closes the gate again with elapse of a certain time (Act 21), and repeats the processing in Acts 21~27 to accumulate various captured images of the user in the memory 37.

The controller 36 learns the common characteristics of the appearance of the user photographed so far through a deep learning method each time the user is photographed (Act 25).

In this way, the controller 36 recognizes short height of the user as the common characteristic of the appearance of the user because the most of the users are children in the children's facilities.

The controller 36 carries out the authentication on the basis of the captured image of the user (Act 28) if recognizing the common characteristic of the appearance of the user (YES in Act 26). Thus, if the user who is a child stands in front of the gate, the controller 36 determines that the height of the user is short on the basis of the captured image of the user acquired in the processing in Act 23. The controller 36 opens the gate (Act 27) if it is determined that the user is matching (YES in Act 28). If the user who is an adult stands in front of the gate, the controller 36 determines that the height of the user is high on the basis of the captured image of the user acquired in the processing in Act 23. The controller 36 closes the gate (Act 21) if it is determined that the user is not matching (NO in Act 28).

(Modification)

The image forming apparatus may be operated by anyone without carrying out the authentication through the password and the like before recognizing the common characteristics of the appearance of the user.

An application object of the authentication apparatus includes a television or an air conditioner, a refrigerator, a mobile phone, a door, a vehicle such as a car, a personal computer, and the like in addition of the image forming apparatus and the gate.

Each embodiment described above grasps a person who has high reliability even without the authentication through preset of a manager or a card and a password and can automatically carry out a security measure to a person other than the person having high reliability.

As stated in detail above, according to the technology recorded in the specification, an authentication technology based on a captured image can be provided.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An authentication apparatus, comprising:
   an image capturing device configured to photograph a person to acquire a captured image;
   a memory configured to store the captured image; and
   a controller configured to acquire common characteristics of an appearance of the person in captured images, the captured images including the captured image which includes the person, and to carry out authentication of an authentication object person in a captured image on the basis of the common characteristics of the appearance of the person, wherein the controller is configured to carry out the authentication of the person through an IC card if only a few of the captured images of the person are accumulated not to be able to recognize the common characteristics of the appearance of the person, and the authentication of the person through the common characteristics of the appearance of the person if a lot of the captured images of the person are accumulated to be able to recognize the common characteristics of the appearance of the person.

2. The authentication apparatus according to claim 1, wherein
the controller generates the common characteristics of the appearance of the person as a determination reference and takes that a matching rate between characteristics of the appearance of the person corresponding to the common characteristics in the captured image and the common characteristics reaches a reference as a condition to determine that the person is matching.

3. The authentication apparatus according to claim 1, wherein
the common characteristics of the appearance of the person contain at least one of clothes and body type of the person.

4. The authentication apparatus according to claim 1, further comprising
an operation device configured to receive input, wherein
the image capturing device photographs a person who is present around the authentication apparatus; and
the controller restricts the input received by the operation device if it is determined that the person is not matching.

5. The authentication apparatus according to claim 4, further comprising
a sensor configured to detect that a person is present in a vicinity of the authentication apparatus, wherein
the image capturing device photographs the person if the sensor detects the person.

6. The authentication apparatus according to claim 1, wherein
the controller carries out authentication with an authentication method different from the authentication method using the common characteristics of the appearance of the person before acquiring the common characteristics of the appearance of the person and carries out the authentication with the common characteristics of the appearance of the person after acquiring the common characteristics of the appearance of the person.

7. The authentication apparatus according to claim 1, wherein
the controller is configured to learn the common characteristics of the appearance of the person based on a deep learning method.

8. An authentication method, including:
acquiring common characteristics of an appearance of a person in a plurality of captured images, the plurality of captured images including a captured image which includes the person; and
carrying out authentication of an authentication person in a captured image on the basis of the common characteristics of the appearance of the person, including carrying out the authentication of the person through an IC card if only a few of the captured images of the person are accumulated not to be able to recognize the common characteristics of the appearance of the person, and carrying out the authentication of the person through the common characteristics of the appearances of the person if a lot of the captured images of the person are accumulated to be able to recognize the common characteristics of the appearance of the person.

9. The authentication method according to claim 8, wherein
authentication comprises generating the common characteristics of the appearance of the person as a determination reference and takes that a matching rate between characteristics of the appearance of the person corresponding to the common characteristics in the captured image and the common characteristics reaches a reference as a condition to determine that the person is matching.

10. A server, comprising:
a memory configured to receive a plurality of captured images from an external terminal and acquiring common characteristics of an appearance of a person on the basis of the plurality of the captured images stored in the memory, the plurality of captured images including a captured image which includes the person; and
a processor configured to carry out authentication of an authentication object person in a captured image acquired from the external terminal on the basis of the common characteristics of the appearance of the person, wherein
the server is an image forming apparatus that forms an image on a sheet, and the external terminal is another image forming apparatus.

11. The server according to claim 10, wherein
authentication comprises generating the common characteristics of the appearance of the person as a determination reference and takes that a matching rate between characteristics of the appearance of the person corresponding to the common characteristics in the captured image and the common characteristics reaches a reference as a condition to determine that the person is matching.

12. The authentication method according to claim 8, further including:
learning the common characteristics of the appearance of the person based on a deep learning method.

13. The server according to claim 10, wherein
the processor is configured to learn the common characteristics of the appearance of the person based on a deep learning method.

14. The server according to claim 10, wherein
the processor is configured to return a message indicating that the common characteristics of the appearance of the person are not recognized to the external terminal if only a few of the captured images of the persons are accumulated not to be able to recognize the common characteristics of the appearance of the person, and carry out the authentication of the person through the common characteristics of the appearance of the I person if a lot of the captured images of the person are accumulated to be able to recognize the common characteristics of the appearances of the person.

* * * * *